United States Patent

Schaffer et al.

[15] 3,699,532

[45] Oct. 17, 1972

[54] MULTIPROGRAMMING CONTROL FOR A DATA HANDLING SYSTEM

[72] Inventors: Harry G. Schaffer, Danville; Dan A. Neilson, Moraga; Eleuthere Poumakis, Danville, all of Calif.

[73] Assignee: The Singer Company, New York, N.Y.

[22] Filed: April 27, 1970

[21] Appl. No.: 32,243

[52] U.S. Cl. ............................................340/172.5

[51] Int. Cl. ............................................G06f 9/18

[58] Field of Search ....................340/172.5; 235/157

[56] References Cited

UNITED STATES PATENTS

| | | | |
|---|---|---|---|
| 3,377,619 | 4/1968 | Marsh et al. | 340/172.5 |
| 3,297,994 | 1/1967 | Klein | 340/172.5 |
| 3,400,376 | 9/1968 | McDonnel | 340/172.5 |
| 3,296,596 | 1/1967 | Yagusic et al. | 340/172.5 |
| 3,344,401 | 9/1967 | MacDonald et al. | 340/172.5 |
| 3,378,820 | 4/1968 | Smith | 340/172.5 |
| 3,407,387 | 10/1968 | Looschen et al. | 340/172.5 |

*Primary Examiner*—Paul J. Henon
*Assistant Examiner*—Mark Edward Nusbaum
*Attorney*—Charles R. Lepchinsky, Patrick J. Schlesinger, R. Perry Shipman and Jay M. Cantor

[57] ABSTRACT

A data handling system including a plurality of groups of data originating and/or receiving devices operable asynchronously and independently with respect to each other, each group of such devices being coupled with an associated data transmission controller by means of a common data channel for buffering one unit (character) of data and providing certain basic data transmission controls for transmission of a character between an associated device and a common input/output data channel extending between the controllers and a supervisory control unit which is coupled with a main memory unit and a second data transmission channel. The second data transmission channel provides for transmission of characters between the supervisory control unit, the main memory unit and a data bank comprising a plurality of data storage or secondary data handling devices. The supervisory control unit provides the necessary elementary functional components to handle and control transmission of data between the data input/output devices and, the main memory and the data bank. The main memory unit is partitioned into a plurality of a section by means of adjustable hardware connected at each data transmission controller so as to permit only the data originating/receiving devices associated with it to communicate with an associated particular partitioned section of memory and an additional section of the memory is provided that is accessible to all partitions of the main memory unit. The supervisory control unit provides for a program stored in each particular section of the main memory unit to be executed for a predetermined period of time and then upon completion of successful branch operation in the program for a switch to performance of the program in the next section in a continuous round robbin for all sections manner. When a program instruction in one section of the main memory unit dictates performance of input/output operation a switch is made to another section but processing is suspended until the input/output operation is completed and then processing is commenced of the program instructions in the next section of the main memory unit. The supervisory control unit also includes functional components to perform certain basic arithmetic operations on the various data such as addition, subtraction, etc.

14 Claims, 16 Drawing Figures

INVENTORS
Dan A. Neilson
Harry G. Schaffer
Eleuthere Poumakis
BY

| | MSD | | | LSD | | |
|---|---|---|---|---|---|---|
| MAIN MEMORY STORAGE LOCATION | 2301 | 2302 | 2303 | 2304 | | |
| | 0 | 0 | 0 | 1 | b7 | (SIGNBIT) |
| | 1 | 1 | 1 | 1 | b5 | |
| DATA CHARACTER | 0 | 1 | 0 | 1 | b4 | BCD CODE |
| | 0 | 1 | 1 | 0 | b3 | |
| | 0 | 1 | 1 | 0 | b2 | |
| | 1 | 0 | 0 | 1 | b1 | |
| DATA WORD | 1 | 7 | 6 | 9 | DECIMAL NUMBER | |

PATENTED OCT 17 1972 3,699,532

SHEET 03 OF 13

PATENTED OCT 17 1972 3,699,532

SHEET 04 OF 13

| CHARACTER LOCATION № | XXX0 | XXX1 | XXX2 | XXX3 | XXX4 | XXX5 | XXX6 | XXX7 | XXX8 | XXX9 |
|---|---|---|---|---|---|---|---|---|---|---|
| b7 | F3 FUNCTION | F2 | F1 CODE | F0 | AC ADDRESS MARKER | 1A1 INDEX REG ADDRESS | 1AØ | 1B1 INDEX REG ADDRESS | 1BØ | BC ADDRESS MARKER |
| b5 | 1 | 1 | 1 | 1 | 1 | 1 | 1 | 1 | 1 | 1 |
| b4 | LA4 | $A3_4$ | $A2_4$ | $A1_4$ | $AO_4$ | LB4 | $B3_4$ | $B1_4$ | $B1_4$ | $BO_4$ |
| b3 | LA3 | $A3_3$ | $A2_3$ | $A1_3$ | $AO_3$ | LB3 | $B3_3$ | $B2_3$ | $B1_3$ | $BO_3$ |
| b2 | LA2 | $A3_1$ | $A2_2$ | $A1_2$ | $AO_2$ | LB2 | $B3_2$ | $B2_2$ | $B1_2$ | $BO_2$ |
| b1 | LA1 | $A3_1$ | $A2_1$ | $A1_1$ | $AO_1$ | LB1 | $B3_1$ | $B2_1$ | $B1_1$ | $BO_1$ |

INSTRUCTION WORD

Fig. 8

MULTIPROGRAMMING CONTROL FOR A DATA HANDLING SYSTEM

BACKGROUND, FIELD OF INVENTION

The present invention relates to an improvement in data processing systems and, more particularly but not by way of limitation, to an improved multiprogramming arrangement for a data processing system.

BACKGROUND, PRIOR ART

An electronic data handling system is frequently utilized in a real time situation wherein a plurality of input/output devices, commonly called peripheral devices, operating asynchronously with respect to each other are called upon to transmit data between various ones of the peripheral devices and a main memory and to perform arithmetic operations at times, upon data being transmitted.

An example of a real time data handling systems involving a plurality of data handling devices is a large retail store system having a multiplicity of point of sale transaction devices or electronic cash registers interconnected with a central customer credit file, an electronic data processor, and a data bank in the form of a plurality of data files. In such a system, various ones of the ones of the cash registers are operated at random indeterminate times by human operators to enter various sales transaction data such as clerk number, credit card number, item prices, item quantity, discount factors, tax factor, item stock number, etc. In addition, the operator will operate various ones of function initiating keys on the cash register to cause certain operations to take place to effect a complete sales transaction such as "add" to add the currently entered item price to a previously accumulated subtotal quantity, and to total the entire transaction so as to effect a termination of the particular transaction and at the same time effect a human readable printout of the transaction on paper tape.

Another example of a real time data handling system involving a plurality of data handling devices is an accounting or bookkeeping department of a business house, that may be the same retail store mentioned above, which regularly receives purchase orders and has a large accounts payable including but not limited to payrolls, raw materials, and components, and the like. In such a data handling system, the human operator will enter data into the complex by means of an alpha-numeric keyboard such as a typewriter which provides coded electrical output signals indicative of the various keys depressed, a numeric 10-key keyboard, and associated arithmetic function initiating keys, such as associated with a desk-type calculator and a perforated paper tape or edge punched card reader. The various items of data entered into the system are acted upon in various manners to printout by various printing devices, which may include a typewriter, a line printer, etc., a human readable document such as a billing document and the like, or an up-dated inventory record and to retain in a memory bank certain updated data. In order to properly act on the new-entered data, old data such as the former inventory record or customer's account status must be known and included in the action taken on the new data entered. Such old data may be conveniently and economically stored in centrally located devices such as magnetic disc files, magnetic type files, large magnetic core memory devices, and other storage devices in which large amounts of data in machine readable form may be stored and retrieved.

Such central records must be available to a multiplicity of users of the aforementioned input devices. However, it is clear that such input devices will be operating asynchronously with respect to each other and asynchronously with respect to the data storage devices.

A difficult problem exists in the data handling systems of the type described above in coordinating requests for transmission of data between the various devices inasmuch as the requests occur randomly which, of course, means that requests from two or more peripheral devices can occur simultaneously or nearly so.

In order to coordinate requests for the transmission of data between various groups of asynchronously operating input/output devices and a central processor and a main memory bank it has been known to provide an "executive" program which coordinates the performance of each program, that controls the operation of an associated group of input/output devices, with the other required programs. In such a multiprogramming system the executive program becomes quite complicated and occupies not an insignificant amount of storage space. Where there are groups of input/output devices interconnected in a data handling system it has been known to require the dedication of the storage afforded by two magnetic disc storage devices for the executive program alone.

There is, therefore, a need for an apparatus and system to coordinate the operation of a plurality of programs which control the transmission of asynchronously occurring data between various ones of a plurality of data originating and receiving devices and a central processor and memory in an orderly manner with a minimum of delay or queuing of the requests and with a minimum of apparatus parts.

SUMMARY

The advantages of the present invention are achieved by providing a main memory device divided into a plurality of sections or partitions, individual ones of which are associated with individual input/output device controllers and a section common to all the controllers. The individual partitions contain programs and data storage locations associated exclusively with an individual input/output device controller.

A supervisory control unit containing various data handling registers and control gates provide for executing the programs in the various partitions as required in a predetermined manner.

Furthermore, the control elements of the supervisory control unit include controls responsive to a request for service by the individual input/output controllers for interrupting the execution of a program being executed and servicing the input/output controller requesting service. Further, the supervisory control unit includes control gates and logic whereby execution of the program associated with an individual input/output controller is interrupted automatically after a certain predetermined time period has expired and execution of the program associated with the next sequential input/output controller is commenced so that execution of the programs is conducted on a sequential time-shared round robin basis.

It is therefore an object of the present invention to provide an improved multiprogramming system for handling data and programs associated with a plurality of groups of asynchronously operating peripheral devices.

The present invention may best be understood when the below description is read in connection with the drawings.

BRIEF DESCRIPTION OF THE DRAWINGS

FIG. 8 is an illustration of an instruction word of the present invention.

DESCRIPTION OF AN EMBODIMENT

Figure 1:
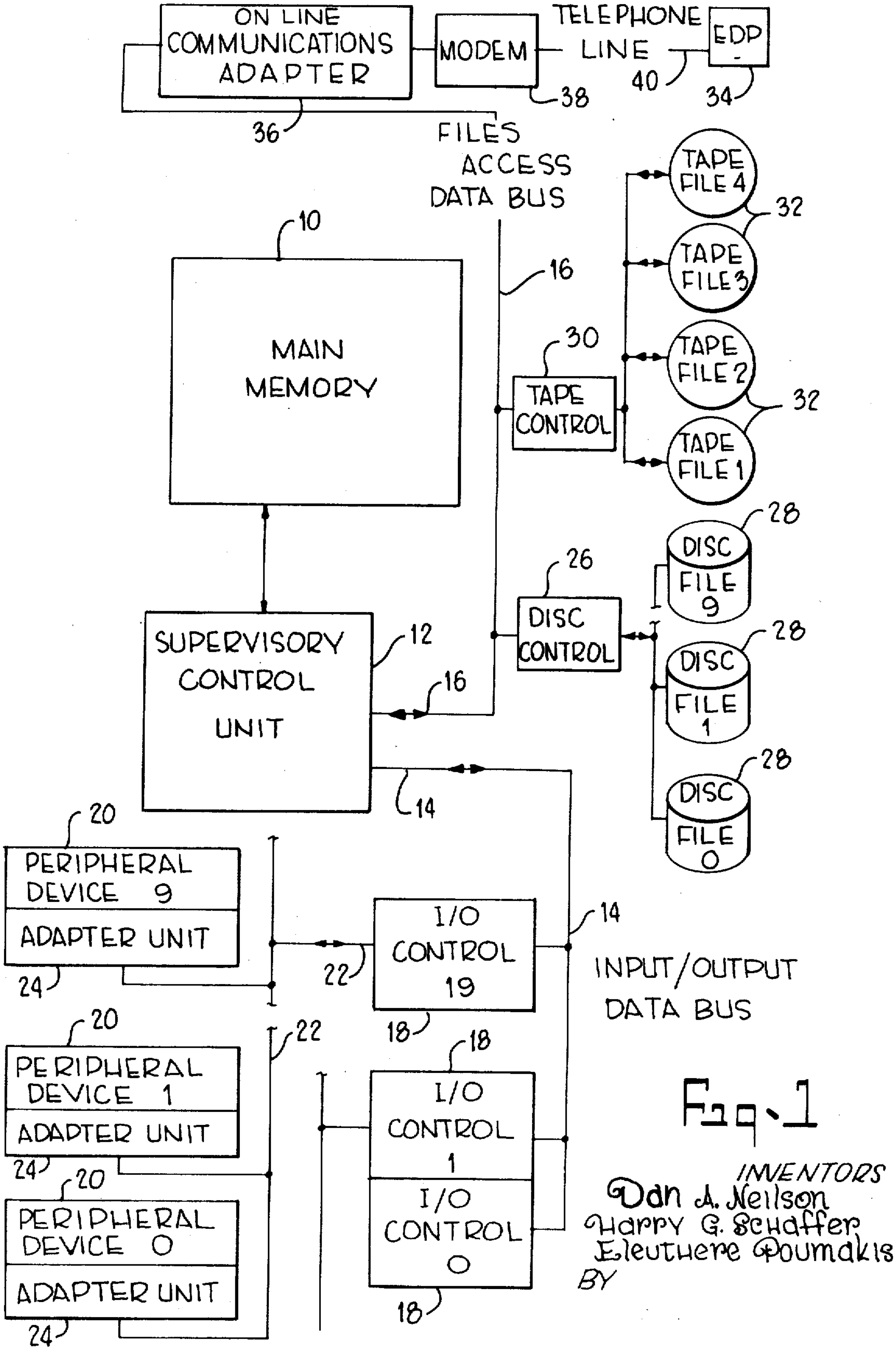
FIG. 1 is a simplified block diagram showing a data handling system utilizing the present invention.

In FIG. 1, there is shown in block diagram form a data handling system incorporating the present invention. A main memory 10 provides for storage and retrieval of data and operating programs utilized in the system of the present invention, data received from and to be transmitted to other operating units, and data comprising special information to be acted on by a supervisory control unit 12. The supervisory control unit 12 contains various gates, registers, and control elements to provide an orderly storage of data into and retrieval from the main memory to act on such instructions to operate upon various items of data such as addition and subtraction, to control and effect transmission and receipt of data over input/output data bus 14 and files access data bus 16.

Up to twenty input/output controllers 18 may be coupled with the input/output data bus 14. Each input/output controller is associated with a user group of up to 10 peripheral devices 20 and is coupled with its user group of peripheral devices by means of a two-wire data line 22. Each input/output controller 18 provides buffer storage of a seven-binary bit character. As will be explained in more detail below, each user group of peripheral devices 20 and its associated input controller 18 is treated by the supervisory control unit as independent of the other user groups.

Each peripheral device 20 may be, for example, a point of sale transaction device that can transmit data to its associated input/output controller 18 in response to manual actuation of various ones of numeral keys, function keys, or card reading devices. One preferred point of sale transaction device is shown and described in copending U.S. Pat. application, Ser. No. 855,904, filed Sept. 8, 1969 by E. L. Asbo et al. for "Data Transaction System" and assigned to the same assignee as the present application.

As shown in FIG. 1, each peripheral device 20 includes an adapter unit 24 which provides data in serial form to the data line from the associated peripheral device. Such adapter units are shown only for the purpose of explaining and emphasizing that in the preferred embodiment of the present invention data is handled in binary-serial form rather than binary-parallel form. It may be and oftentimes is the case that a peripheral device inherently provides data in binary serial form; in such an event, an adapter unit 24 would not be needed.

A disc controller 26 provides a communications link between the files access data bus 16 and a group of up to 10 magnetic disc storage files 28, which may be of any type well known in the art to which the present invention pertains for storage and retrieval of data. The disc controller 26 provides the necessary controls to access data already stored or recorded in the disc files and for recording new data received over the files access data bus 16 on selected ones of the disc files 28. In the preferred embodiment of the present invention, the disc files 28 contain credit information concerning credit customers. When a customer presents a credit card, the operator of the peripheral device enters the customer's account number by manual operation of numeral entry keys or by an automatic credit card reader. The account number is utilized by the supervisory control unit 12 to cause access to that one of the disc files 28 containing the particular customer's credit account information and such information usually in the form of a "satisfactory," "not-satisfactory" or "no-information, refer to manager" signal is transmitted back to the originating peripheral device, for appropriate action by the clerk who is operating the point of sale transaction peripheral device.

Likewise, in a similar manner, a tape controller 30 provides a communications link between the files access data bus 16 and a group of up to four magnetic tape storage files 32 which may be of any well-known type. The tape controller 30 provides the necessary controls to access data already stored or recorded on the tape files and for recording new data received over the files access data bus onto selected ones of the tape storage files 32. In the preferred embodiment of the present invention, the tape files 32 are used to store or accumulate transaction data originating at the peripheral devices 20. Such accumulated data may then be retrieved and utilized by an electronic data processor. Such use may be implemented by physically connecting a separate electronic data processor (not shown) to the tape controller 30, or by physically removing the reels of tape from the tape files 32 and placing them on other tape file units associated with the separate electronic data processor.

Also, the data accumulated on the tape files may be transferred to a central electronic data processor 34 shown in FIG. 1. Communications between the electronic data processor 34 and the files access data bus 16 is provided by an on-line communications adapter 36, a modem 38 which couples with a telephone line 40 in a well-known manner.

The supervisory control unit 12 may access the electronic data processor 34 to cause direct on-line operations on data as desired.

DATA REPRESENTATION

In the preferred embodiment of the present invention a unit of data is termed a character. Within the supervisory control unit 12 and main memory 10 of FIG. 1, a single character is comprised of six binary bits. Each binary bit is represented by a voltage or current level in a circuit or a direction of magnetization in a magnetic core storage device as is well known in the art and hence not further discussed in this application.

However, the peripheral devices 20 in the preferred embodiments of the present invention utilize the USACII code which is a seven bit binary code as shown in Table I.

TABLE I.—USACII CODE CHART

| Bits: | | | | | | | | | | | | |
|---|---|---|---|---|---|---|---|---|---|---|---|---|
| b7 → | | | | | 0 | 0 | 0 | 0 | 1 | 9 | 1 | 1 |
| b6 → | | | | | 0 | 0 | 1 | 1 | 0 | 0 | 1 | 1 |
| b5 → | | | | | 0 | 1 | 0 | 1 | 0 | 1 | 0 | 1 |
| Bits | | | | | Column | | | | | | | |
| b4 | b3 | b2 | b1 | Row | 0 | 1 | 2 | 3 | 4 | 5 | 6 | 7 |
| 0 | 0 | 0 | 0 | 0 | NUL | DLE | SP | 0 | @ | P | ' | p |
| 0 | 0 | 0 | 1 | 1 | SOH | DC1 | ! | 1 | A | Q | a | q |
| 0 | 0 | 1 | 0 | 2 | STX | DC2 | " | 2 | B | R | b | r |
| 0 | 0 | 1 | 1 | 3 | ETX | DC3 | # | 3 | C | S | c | s |
| 0 | 1 | 0 | 0 | 4 | EOT | DC4 | $ | 4 | D | T | d | t |
| 0 | 1 | 0 | 1 | 5 | ENQ | NAK | % | 5 | E | U | e | u |
| 0 | 1 | 1 | 0 | 6 | ACK | SYN | & | 6 | F | V | f | v |
| 0 | 1 | 1 | 1 | 7 | BEL | ETB | ' | 7 | G | W | g | w |
| 1 | 0 | 0 | 0 | 8 | BS | CAN | ( | 8 | H | X | h | x |
| 1 | 0 | 0 | 1 | 9 | HT | EM | ) | 9 | I | Y | i | y |
| 1 | 0 | 1 | 0 | 10 | LF | SUB | * | : | J | Z | j | z |
| 1 | 0 | 1 | 1 | 11 | VT | ESC | + | ; | K | [ | k | { |
| 1 | 1 | 0 | 0 | 12 | FF | FS | , | < | L | \ | l | \| |
| 1 | 1 | 0 | 1 | 13 | CR | GS | - | = | M | ] | m | } |
| 1 | 1 | 1 | 0 | 14 | SO | RS | . | > | N | ^ | n | ~ |
| 1 | 1 | 1 | 1 | 15 | SI | US | / | ? | O | _ | o | DEL |

Reference to Table I shows a set of function control acronyms in columns 0 and 1 and a set of normal data symbols in columns 2, 3, 4, 5, 6, and 7. Each of the function control acronyms and normal data symbols may be represented by a unique seven-bit binary code as shown by the appropriate binary "0" or "1" (*b*1, *b*2, *b*3, *b*4, *b*5, *b*6, and *b*7) associated with each binary order of the binary code for the acronyms and symbols.

Figures 2, 3:
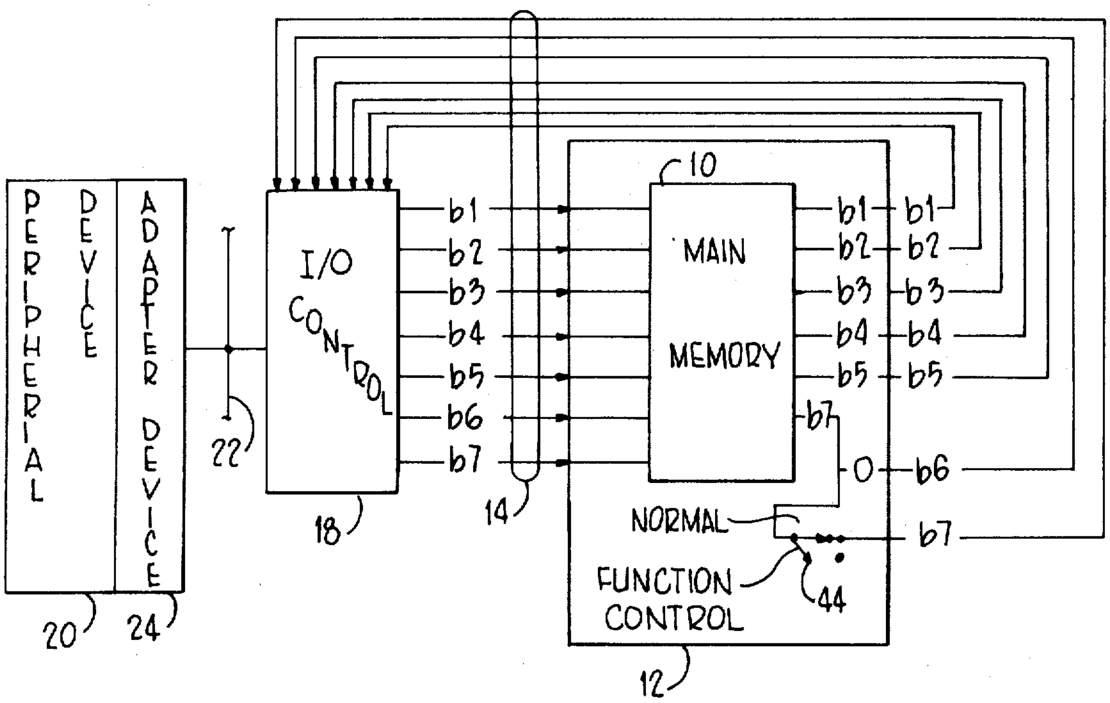
FIG. 2 is a simplified block diagram showing the data conversion scheme utilized in the present invention.
FIG. 3 is an illustration showing typical data characters and a data word as stored in the main memory of the present invention.

Reference is now made to FIG. 2 wherein there is shown one peripheral device 20 and its associated adapter unit 24. As previously mentioned the data line 22 is indicative of a two wire cable which connects the adapter unit 24 to its associated input/output controller 18. The input/output controller 18 receives and transmits serially data in the form of seven-bit characters. A data character transmitted from the input/output controller 18 to the supervisory control unit 12 is demonstrated in FIG. 2 by the seven binary signal lines designated *b*1, *b*2, *b*3, *b*4, *b*5, *b*6, and *b*7 contained within input/output data bus 14 and having direction arrows pointing into the supervisory control unit 12. A data character transmitted from the supervisory control unit 12 to an input/output controller 18 is demonstrated in FIG. 2 by the seven binary signal lines designated *b*1, *b*2, *b*3, *b*4, *b*5, *b*6, and *b*7 contained within input/output data bus 14 and having direction arrows pointing into the input/output controller 18.

However, the supervisory control unit 12 and, of course, the main memory 10 uses only a six-bit binary code. As shown in FIG. 2, the sixth level signal line *b*6 from the input/output controller in input data bus 14 is simply terminated at the supervisory control unit. All data within the supervisory control unit and the main memory that is received from an input/output controller 18 comprises the first five binary order signals (*b*1, *b*2, *b*3, *b*4, and *b*5) plus the seventh binary order signal (*b*7) of the associated USACII code. Reference to Table I demonstrates that codes for the symbols in columns 6 and 7 are, within the supervisory control unit, indistinguishable from the codes for symbols in columns 4 and 5, respectively, since the sixth binary order (*b*6) has been deleted.

In order to keep proper reference to the USACII codes throughout the remainder of this specification, all data codes in the supervisory control unit, the main memory, and other operating units, and subunits, of the present invention will be mentioned as six-bit codes comprised of binary orders *b*1, *b*2, *b*3, *b*4, *b*5, and *b*7 (*b*6 is not used unless otherwise noted) of the standard USACII code chart, as shown in Table I.

When non-function command data is transmitted from the supervisory control unit 12 to an input/output controller 18, the system is said to be operating in the "normal" mode. When operating in the "normal" mode, the seventh order bit (*b*7) in the set of six bits comprising a character of data within the supervisory control unit is logically inverted by inverter 42 (FIG. 2) and transmitted from the inverter as the sixth order bit (*b*6) of a true seven bit USACII code on input/output data bus 14 to the input/output controller 18. Additionally, when the system is operating in the "normal" mode, the seventh bit (*b*7) of the data character within the supervisory control unit 12 is transmitted through a gating switch 44 and over the input/output data bus 14 as the seventh order bit (*b*7) of a seven bit USACII code to the input/output controller 18.

Thus, as shown in Table I, six-bit codes within the supervisory control unit representative of the symbols in columns 2, 3, 4, and 5 will be transmitted to the input/output controller 18 as seven-bit codes representative of the symbols in the same respective columns.

When the system is to transmit command or function codes, the internal logic places the system in the "Write Control Functions" mode of operation. In the Write-Control Functions mode of operation, the switch 44 in the supervisory control unit 12 (FIG. 2) is caused to disable transmission of the seventh order bit (*b*7) of data from the supervisory control unit over the input/output controller data bus 14. This is shown by the Function Control position of gating switch 44 in FIG. 2. With switch 44 in the Function Control position, the seventh order bit (*b*7) that is received or detected by the input/output controller 18 is always a binary "0". Thus, the codes received by the input/output controller will be indicative of the functions or operations listed in columns 0 and 1 of Table I.

DATA FORMAT

A data character in the present invention is comprised of six binary bits and as mentioned previously, the bit orders are designated according to character codes in the USACAII code chart with the sixth order or bit of the USACAII dropped or missing. A single data character is contained in, i.e., stored in, and retrieved from, a single storage location or address in main memory 10.

A data word is one or more data characters in contiguous or successive locations in the main memory 10 and the contiguous data characters are treated as a unit or word by some program instruction. Generally, each data character is representative of a decimal digit. The first four binary orders (*b*1, *b*2, *b*3, and *b*4) are the BCD code for the represented decimal digit, the fifth order binary bit (*b*5) is always a "1" bit and the sixth order bit (*b*7) in the least significant decimal digit or character code is a binary "0" when the word (number) is positive and is a binary "1" when the word (number) is negative.

As shown in FIG. 3, the decimal number −1769 is a four character word, successive decimal digits or characters of which are stored, for example, in successive main memory locations 2301, 2302, 2303, and 2304 and the least significant decimal digit or character's sixth binary bit (*b*7) contains a "1" bit to signify that the number has a negative value.

A "Field" is one or more contiguous or successive locations in the main memory reserved for a specific category of data. A "Field" can contain one or more words.

MAIN MEMORY

Figure 4:
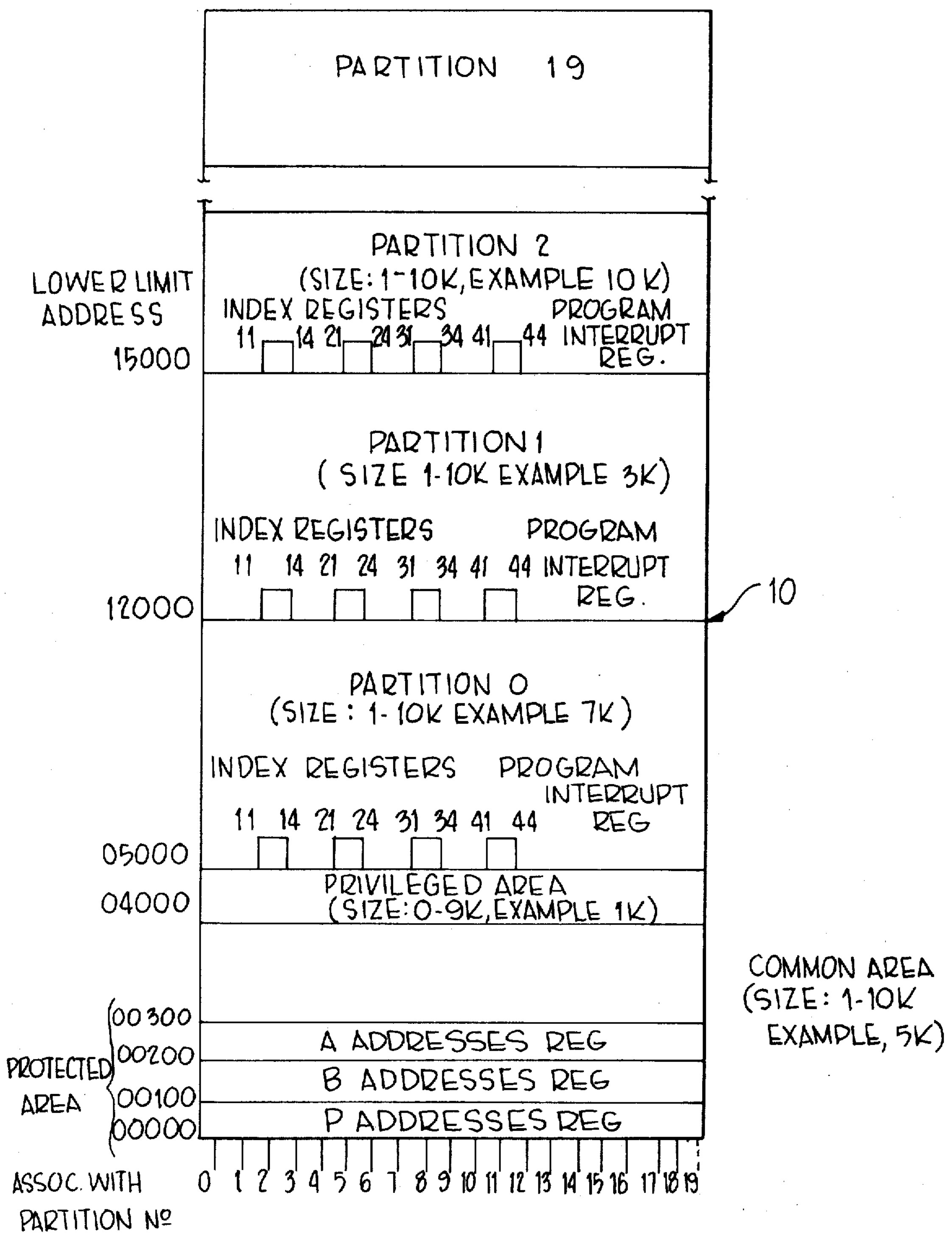
FIG. 4 is a simplified illustration of the main memory showing the partitioning of the main memory.

The main memory 10 of FIG. 1 is shown in more detail in FIG. 4. The main memory 10, in the preferred embodiment of the present invention, is a ferrite core type of addressable memory well known in the art and not further described herein as to its physical structure. Reference is made to Section 12 of the "Computer Handbook" edited by H. D. Huskey and G. A. Korn, published by the McGraw Hill Book Company in 1962 for a more detailed description of magnetic core memory devices such as main memory 10. It is to be understood that while a main memory 10 having a certain number of data storage locations is illustrated the main memory 10 is constructed in a modular manner so that additional storage locations may be provided by increasing the size of the main memory 10 in a manner known in the art. Each addressable memory storage location will hold six binary bits comprising one data character. The particular size (number of memory storage locations) of the main memory 10 is a matter of choice within the limits (minimum and maximum) of other structural elements of the present invention as is described herein with respect to a preferred embodiment.

The address of each storage location is defined by a decimal number. However, it is not always necessary to use the high order decimal digits to define or specify a particular storage location due to the unique and improved addressing or memory accessing control logic elements which are part of the supervisory control unit 12, as will be described in more detail below.

As mentioned previously with reference to FIG. 1, each input/output controller 18 is considered to be associated with a different independent user of a unique set or group of peripheral devices 20. Obviously, only one peripheral device 20 may be associated with one input/output controller 18. Thus, the group of peripheral devices 20 associated with input/output controller No. 1 is a separate user group distinct from another user group of peripheral devices associated with, for example, input/output controller No. 0, No. 2, etc.

In the present invention, program instructions stored in the main memory 10 in cooperation with the logic control elements of the supervisory control unit 12 can be said to divide or partition the main memory into several sections or partitions, although it should be kept in mind that the various partitions of main memory need not be and are not in reality separate physical entities in the preferred embodiment, although they could be if so desired.

Each of the input/output controllers 18 of FIG. 1 has associated therewith a separate main memory partition. Main memory partition No. 0 shown in FIG. 4 is associated with only input/output controller No. 0 of FIG. 1; likewise, main memory partition No. 1 is associated with only input/output controller No. 1 of FIG. 1, etc.

Each main memory partition may be of up to 10,000 storage character locations in size; the individual partitions need not be all of the same size. For example, as shown in FIG. 4, partition No. 0 is 7,000 storage locations in size, while partition No. 1 is 3,000 storage locations in size, and partition No. 2 is 10,000 storage locations in size. The size of each partition (number of storage locations) is generally a fixed quantity but may be changed by appropriate adjustable connections in the individual input/output controller's partition beginning location logic and control elements. Thus, the particular size of the portion of the main memory 10 which is associated with a particular input/output controller 18 is determined by connections at the controller 18 and as memory requirements of the particular devices associated with input/output controller 18 change the size of the memory portion available to each controller may be suitably adjusted.

Each partition must begin at a storage location that is a multiple of 1,000.

As shown in FIG. 4, the five digit number appearing immediately to the left of the lower left-hand corner of the individual partition walls (imaginary) is the address of the first storage location associated with that partition. Thus, partition No. 0 begins at storage location 05000, while partition No. 1 begins at storage location 12000, etc.

INDEX STORAGE REGISTERS

Within each partition, there are three groups of four storage locations each that may be utilized by what is generally known in the art as index registers. The first index register of each partition comprises storage locations 11, 12, 13, and 14, relative to the beginning storage location. Thus, as shown in FIG. 4, the first index register associated with partition No. 0 comprises storage location 5011, 5012, 5013, and 5014, while the first index register associated with partition No. 1 comprises storage locations 12011, 12012, 12013, and 12014. Likewise, the second index register of each partition comprises locations 21, 22, 23, and 24 relative to the beginning storage location of the partition, while the third index register of each partition comprises storage locations 31, 32, 33, and 34 relative to the beginning storage location of the partition.

There is no restriction on the use of the storage locations described above exclusively as index registers. In other words, the index register storage locations may be used to store ordinary data or program data as desired.

However, data stored in the index registers provide for up to four decimal digits per index register that may be utilized by the supervisory control unit 12 (FIG. 1) to add to certain main memory location addresses being handled within the supervisory control unit, as will be explained more fully below.

PROGRAM INTERRUPTED STORAGE REGISTER

Locations 41, 42, 43, and 44 relative to the beginning storage locations of each partition are a Program Interrupted Storage Register and must be reserved for receipt of a four digit program interrupted (PI) number generated within the supervisory control unit upon the occurrence and detection of certain errors. The PI number will be a number 11 greater than the main memory address of the location that contained the last program instruction attempted to be executed by the system prior to tection of an error (i.e., the address of the instruction that resulted in an error when execution of that instruction was attempted) except for Input/Output (I/O) instructions.

In the case of attempted execution of an Input/Output instruction resulting in detection of an error, the PI number inserted into the Program Interrupt Storage locations (relative locations 41–44) will be a number 1 greater than the address of the instruction that resulted in an error detection.

The various errors that can be detected are classified into three groups as set forth below.

Addressing Errors a. Access requested to a storage location having an address greater than the upper limit address (last address) of the partition associated with the user (input/output device) whose program is being executed.

b. Access requested into a Common Area (described in more detail below) storage location of main memory having an address greater than the upper limit address (last address) of the Common Area.

c. Access requested into the Privileged Area of the Common Area (described in more detail below) by a user not privileged to access the Privileged Area.

Invalid Operation Code

An instruction retrieved from a memory location that contains an invalid operation code 2, 3, or 10.

Data Fault a. Lack of a binary "1" in the *b*5 position of an instruction character retrieved from main memory during the BEGIN operation (retrieval of a new instruction character) of the supervisory control unit.

c. Decimal value of the *b*1, *b*2, *b*3, and *b*4 positions of an instruction character retrieved from main memory during BEGIN operation of the supervisory control unit exceeds "9".

d. Decimal value of the *b*1, *b*2, *b*3, and *b*4 positions of any character retrieved from an Index Register during an INDEX operation of the supervisory control exceeds "9".

e. Decimal value of the *b*1, *b*2, *b*3, and *b*4 positions of any character read from main memory as a disc storage device address exceeds "9".

Common Area

The address locations of the main memory, FIG. 4, prior to partition No. 0 is termed the Common Area. The Common Area may contain up to 10,000 character storage locations, in increments of 1,000. As shown in FIG. 4, one embodiment of the present invention has a Common Area containing 5,000 storage locations.

The Common Area is shared by all users of all the peripheral device user groups; this common sharing is controlled by various logic control elements described in more detail below.

Protected Area

The first 300 character storage locations of the Common Area are termed the Protected Area. Data may be read from the Protected Area by the programs for all peripheral device users; data may not be written into the Protected Area during normal usage of the system by a peripheral group user except by normal program execution. Data is preloaded into the Protected Area only during special set up procedures during serving or test procedures only and as part of the normal operating sequence of the supervisory control unit's logic elements.

P-Addresses Register

Figure 5:
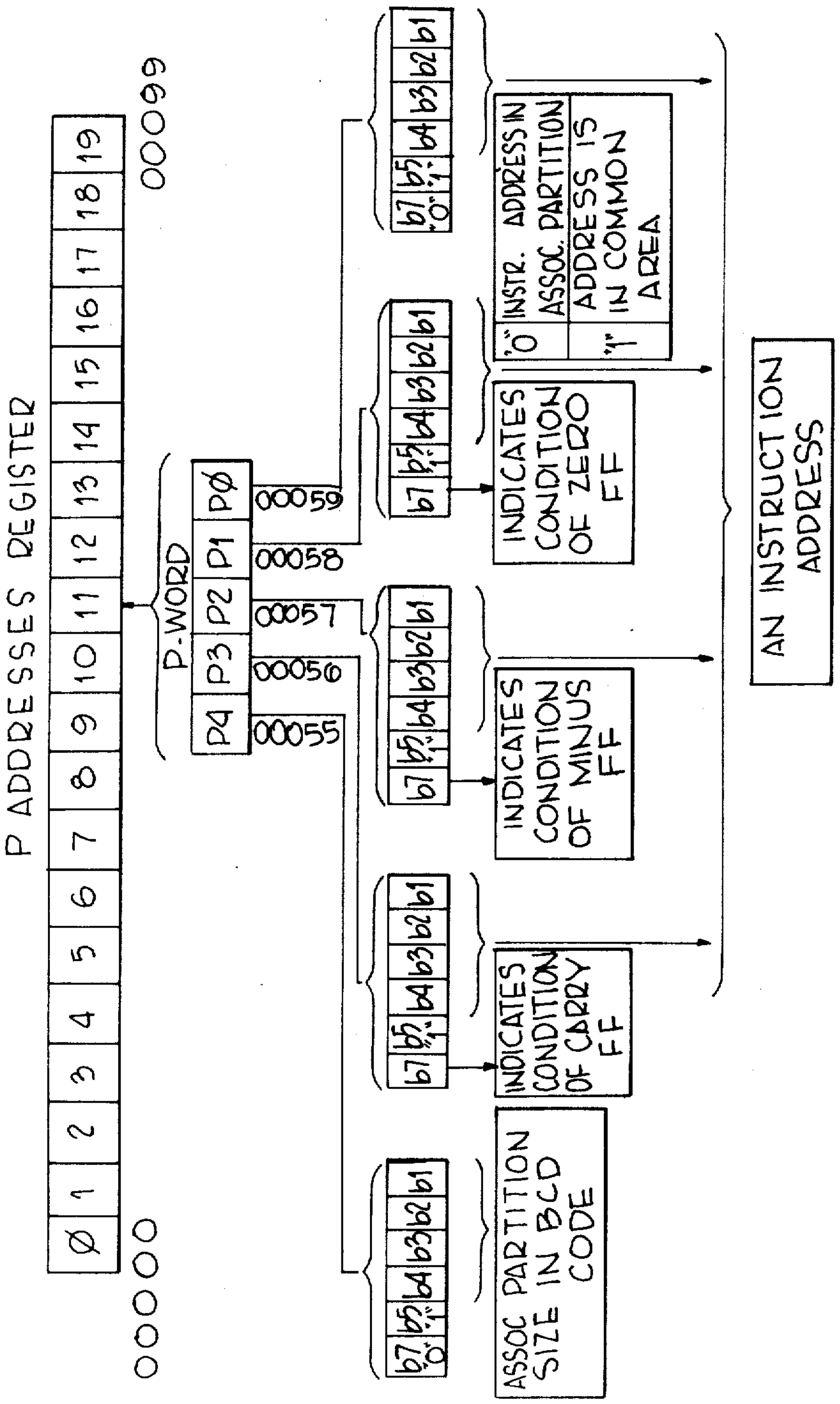
FIG. 5 is an enlarged portion of FIG. 4.

The first 100 storage locations of the Protected Area (locations 0–99) is termed P-address register and is subdivided in 20 P-words of five character locations each. Each P-word is associated with an individual peripheral device user group or partition as shown in FIG. 4. The content of each P-word is now described with reference to FIG. 5. In FIG. 5, the format for the P-word No. 11, associated with peripheral device user group and main memory parition No. 11 is shown as occupying Protected Area P-address register character storage locations 55–59. The first four characters (P0–P3) of the P-word are used principally for specifying the address or storage location in main memory of an instruction associated with the P-word partition number or Common Area. Only the first four bits (*b*0, *b*1, *b*2, and *b*3) of the first four instruction address characters (P0–P3) are used to define the location of the instruction. A decimal value of "one" in the first instruction character (P0) indicates that the supervisory control unit is not currently servicing the partition and peripheral user group associated with the P-word. When the PO character of a P-word is decimal "one," the instruction address defined by characters P0–P3 is the address or location of the next instruction to be accessed by the supervisory control unit when it resumes servicing the Common Area partition or peripheral user group associated with the P-word number.

When the least significant character (P0) of a P-word is decimal "zero," the instruction address defined by characters P0–P3 is indicative of the fact that the peripheral user group and associated main memory partition associated with the P-word number are currently being serviced. In this case, the contents of the P-word for the partition being serviced do not indicate or reflect the current status of the partition being serviced.

The sixth order (*b*7) of the first character (P0) of the P-word is set to a binary "1" to indicate that the instruction address defined by the first four characters of the P-word is in the Common Area, and is set to a binary "0" to indicate that the instruction address is in the main memory partition associated with the P-word number.

The sixth bit (*b*7) of the next to least significant character (P1) of the P-word is utilized for storage of the status (binary 1 or 0) of a zero condition flip-flop in the supervisory control unit, which will be described in more detail below.

The sixth bit (*b*7) of the third character (P2) of the P-word is utilized for storage of the status (binary 1 or 0) of a minus condition flip-flop (to be described below) in the supervisory control unit.

The sixth bit (*b*7) of the fourth character (P3) of the P-word is utilized for storage of the status (binary 1 or 0) of a carry flip-flop in the supervisory control unit.

Storage of the status of the zero, minus, and carry condition flip-flops is necessary in order to provide resumption upon an occurrence of a conditional branch instruction in the subsequent continued execution of a program associated with the particular partition/P-word number.

The first four bits or orders (P0–P3) of the fifth character (P4) is a binary code indicative of the size of the main memory partition associated with the particular P-word number.

The storage of the status of the condition flip-flops in a P-word is of no significance when the supervisory control unit is operating, i.e., engaged in an input/output transfer of data as described below.

B-Addresses Register

As shown in FIG. 4, the next or second one hundred storage locations of the Protected Area of the Common Area of the Main Memory 10 is a field entitled B-Addresses Register. The B-Addresses Register is a field comprised of 20 five-character locations for receiving a B-Word. Each B-Word location is associated with a correspondingly numbered main memory partition and peripheral user group.

Figure 6:
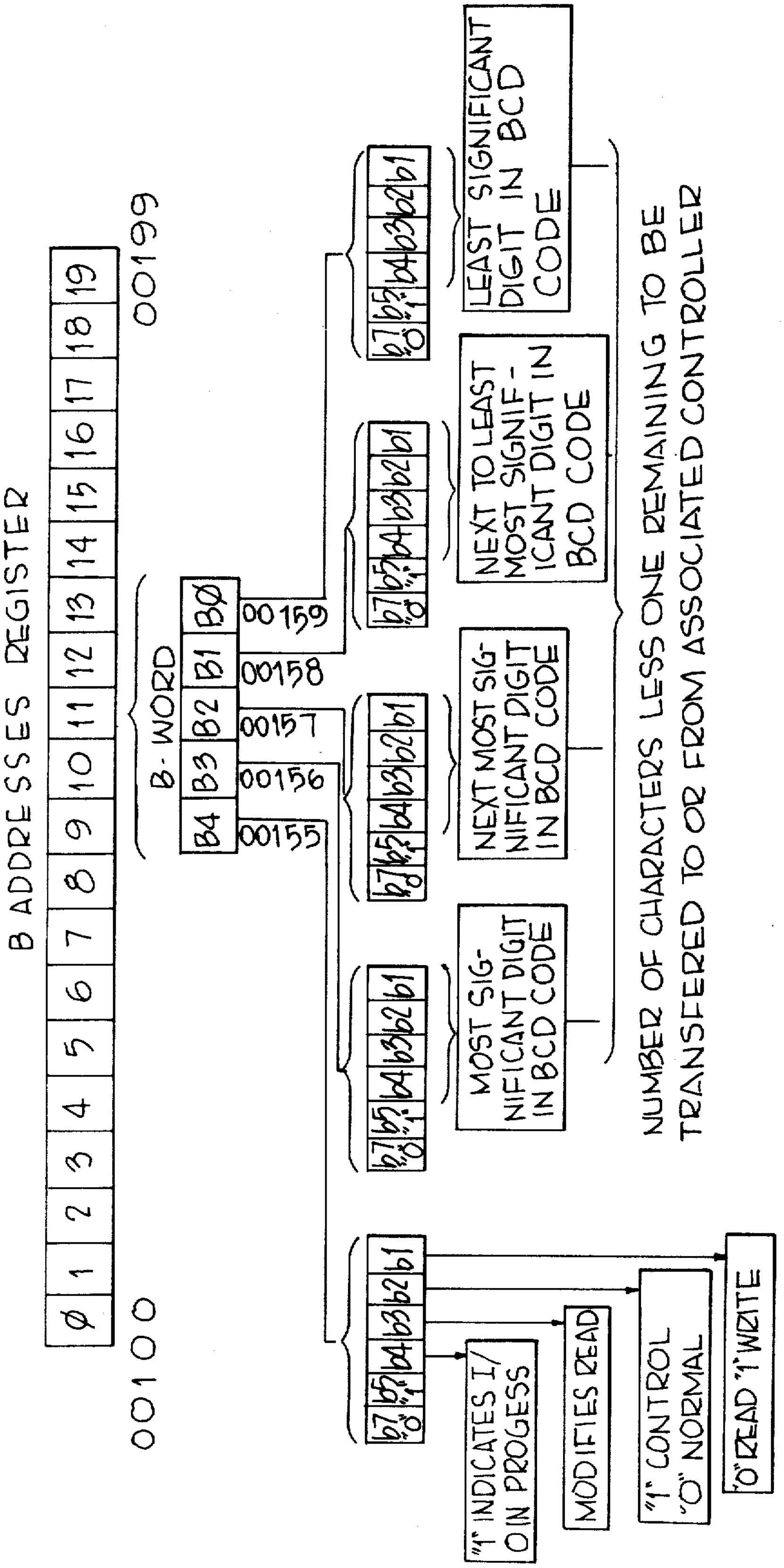
FIG. 6 is an enlarged portion of FIG. 4.

In FIG. 6, there is shown by way of example a B-Word format contained in B-Word location No. 11 which is comprised of the five contiguous character locations 155–159 (B4–B0). B-Word No. 11 is associated with a peripheral user group and main memory partition No. 11.

The least significant four characters (B0–B3) of a B-Word specify the number or quantity of characters less one remaining to be transferred between the associated numbered input/output controller and the supervisory control unit.

The first four bits (*b*1–*b*4) of each of the first four characters B0–B3) of the B-Word are used as BCD codes for defining the quantity (less one) to be transferred, as illustrated in FIG. 6. The fifth bit (*b*5) of all of the characters (B0–B4) of the B-Words are of no significance and are always a binary "1". The sixth bit (*b*7) of all of the characters (B0–B4) of a B-Word are of no significance and are always a binary "0".

The first four bit positions of the most significant character (B4) of a B-Word are used for storing various portions of an instruction and for control purposes. Position *b*1 of character B4 receives a bit (FO) from the function code of an accessed instruction; the bit is binary "1" if the instruction is a "write" instruction and a binary "0" if the instruction is a "read" instruction. (Instruction format and instruction description is discussed below).

Position *b*2 of character B4 receives a bit (LB2) from the length of B-field portion of an instruction; if the bit is a binary "1", it is indicative that writing (transmission) of data from the supervisory control unit takes place in the "Normal mode"; i.e., the six bit internal code is converted to a seven bit USACII code as described previously. If the bit is a binary "0", it is indicative that writing (transmission) of data from the supervisory control unit is to take place in modified or "-control" form so as to complement the internal sixth bit (*b*7) to fill the USACII sixth bit (*b*6) and force the USACII seventh bit (*b*7) to binary zero.

Position *b*3 of character B4 receives a bit LB3 from the accessed instruction which bit is a binary "1" when the reading of data from an input/output controller is to take place in modified form, i.e., no previous data in a field is to be cleared to zero when no new data is available to read into various portions of the field. The bit is binary "0" when reading into a field is to take place in normal or unmodified form, i.e., lack of new data characters to fill up a field results in clearing of the remainder of the field.

Position *b*4 of character B4 receives a binary "1" bit when associated input/output controller is active.

A-Addresses Register

Figure 7:
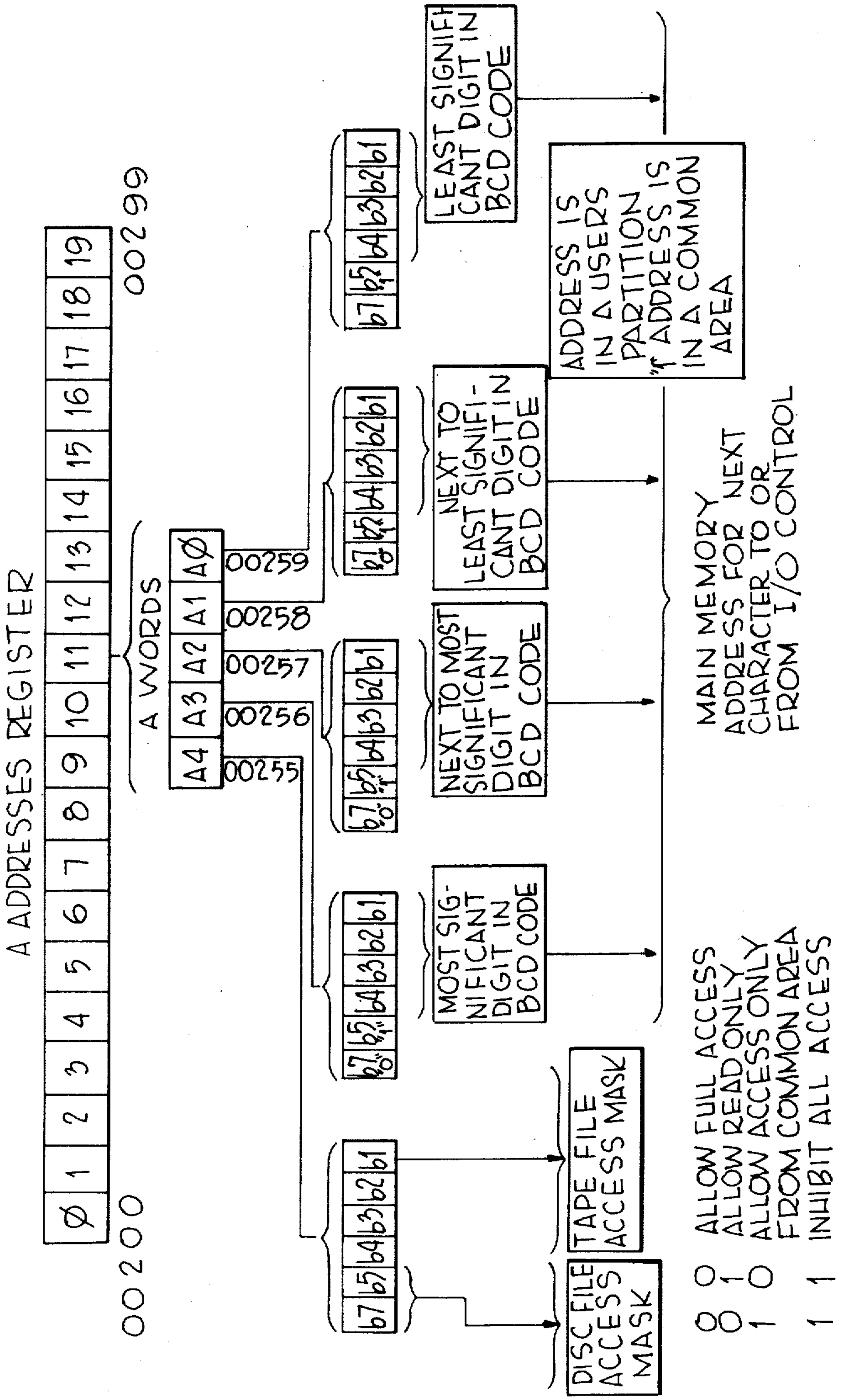
FIG. 7 is an enlarged portion of FIG. 4.

The third field of 100 character locations (locations 200–299) of the Protected Area of the Common Area of the Main Memory is designated A-Addresses Register. The A-Addresses Register comprises 25 character A-Words each associated with a correspondingly numbered user group and partition as shown in FIGS. 4 and 7. The first four bits (*b1–b3*) of the first four characters (A0–A3) are used to store the binary coded decimal code for the location in main memory of where the next data character to or from the input/output controller is to be written or read, respectively. The fifth bit (*b5*) of the first four characters (A0–A3) are of no significance and are always filled with a binary "1".

The sixth bit (*b7*) of the first character (A0) is a binary "0" when the address or location specified by the first four characters is located in the corresponding main memory partition and is a binary "1" when the location specified is in the Common Area.

The sixth bit (*b7*) of the second, third, and fourth characters (A1, A2, and A3) are of no significance and are filled with a binary "0".

The first four bit positions (*b1–b3*) of the fifth character (A4) are used to indicate inhibit of access to any or all of four files 32 (FIG. 1). A "1" in bit position *b1* inhibits access to the first tape device, while a "1" bit in bit position *b2* inhibits access to the second tape device, etc.

Bit positions *b5* and *b7* of the fifth character (A4) define a binary code to control access to the disc files 28 (FIG. 1) as shown in FIG. 7.

Privileged Area

An upper field in the Common Area is designated Privileged Area, as shown in FIG. 4. The Privileged Area is reserved such that only certain (privileged) users may access (read or write) that area. The users who may have access to the Privileged Area are selected by installation of certain wires on the input/output controllers 18 (FIG. 1).

The lower limit (location) of the Privileged Area is defined by a certain jumper wire in the supervisory control unit at the time of installation of the system, or may be changed as desired. The upper limit (location) of the Privileged Area is defined by the wiring defining the upper limit of the Common Area.

Instruction Word

An instruction word is 10 decimal characters long, thus requiring 10 successive main memory locations for storage. The instruction word must begin at a storage location wholly divisible by 10.

The format of an instruction word is shown in FIG. 8. The *b7* bits (F3–F0) of the first four instruction word locations (characters) contain the instruction function code. The instructions and their corresponding codes are as shown in TAble II below.

TABLE II

| Instruction | Function Code | | | | Category |
|---|---|---|---|---|---|
| | F3 | F2 | F1 | F0 | |
| Read | 0 | 0 | 0 | 0 | Input/Output |
| Write | 0 | 0 | 0 | 1 | |
| Add | 0 | 1 | 0 | 0 | |
| Divide | 0 | 1 | 0 | 1 | Arithmetic |
| Multiply | 0 | 1 | 1 | 0 | |
| Subtract | 0 | 1 | 1 | 1 | |
| Transfer Full Character | 1 | 0 | 0 | 0 | |
| Numeric Transfer | 1 | 0 | 0 | 1 | Data Manipulation |
| Branch | 1 | 0 | 1 | 1 | Logic |
| Edit | 1 | 1 | 0 | 0 | |
| Form Numeric Field | 1 | 1 | 0 | 0 | Data Manipulation |
| Compare | 1 | 1 | 1 | 0 | Logic |
| Exchange | 1 | 1 | 1 | 1 | Data Manipulation |

The *b7* bit (AC) of the fifth character (XXX4) of an instruction word contains a binary "1" if the A-field address or location (described below) is in the Common Area and a binary "0" of the A field address or location is in any other portion of the main memory.

Likewise, the *b7* bit (BC) of the 10th character (XXX9) of an instruction word contains a binary "1" if the B field address is in the Common Area of main memory, and a binary "0" if the B-field is in any other portion of main memory.

The *b7* bits (IA1 and IA0) of the sixth and seventh characters of an instruction word define which of the index registers in the partition in which the instruction is located is to be used so as to add the contents of the specified index register to the A field address specified (described below) in the instruction. Table III below shows the codes contained in IA1 and IA0 and the index register specified.

TABLE III

| Index Register | IA1 | IA0 |
|---|---|---|
| None | 0 | 0 |
| 11–14 | 0 | 1 |
| 21–24 | 1 | 0 |
| 31–34 | 1 | 1 |

Likewise the *b7* bits (IB1 and IB0) of the eighth and ninth characters of the instruction word are used to define which of the index registers in the partition in which the instruction is located is to be used to modify the B-field address (to be described below) by adding the contents of the specified index register to the B-field address set forth or specified in the instruction. Table IV below sets forth the code in the IB1 and IB0 positions and the index registers defined by the codes.

TABLE IV

| Index Register | IB1 | IB0 |
|---|---|---|
| None | 0 | 0 |
| 11–14 | 0 | 1 |
| 21–24 | 1 | 0 |
| 31–34 | 1 | 1 |

The *b5* bit of all the characters of an instruction word are of no significance but are each caused to be binary "1".

The first four bits (*b1–b4*) also shown in FIG. 8 as LA1, LA2, LA3, and LA4 of the first character location (XXX0) of an instruction word is a binary coded decimal code for the character length of the A-field. The binary code for decimal 10 is "0000"; thus the A-field may be up to ten characters in length.

Likewise the first four bits (*b1–b4*, also shown in FIG. 8 as LB1, LB2, LB3, and LB4) of the sixth character location (XXX5) of an instruction word is a binary coded decimal code for the character length of the B-field. The B-field may be up to 10 characters in length.

The 4 × 4 block of bit positions in the instruction word comprising the first four bits ($b1$–$b4$) of the second, third, fourth, an fifth character locations (XXX1, XXX2, XXX3, and XXX4) are used to define the beginning location of the A-field (the beginning location of an A-field contains the most significant decimal digit, in BCD form of a data word; the successively lower order decimal digits, in BCD form, will be contained in successively higher numbered locations of main memory up to the length of the A-field as defined by the instruction word as described above).

The first four bit positions ($b1$–$b4$, also shown in FIG. 8 as $A0_1$, $A0_2$, $A0_3$, and $A0_4$) of the fifth character (XXX4) of the instruction word defines in BCD form (A0 being the low order binary bit) the unit's order digit of the beginning location of the A-field. The first four bit positions ($b1$–$b4$, also shown in FIG. 8 as $A1_1$, $A1_2$, $A1_3$, and $A1_4$) of the fourth character (XXX3) defines, in BCD form, the tens order digit of the beginning location of the A-field. Likewise, the bit positions shown in FIG. 8 as $A2_{1-4}$ define, in BCD form, the thousands order digit of the beginning location of the A-field.

In the same manner, the 4 × 4 block of the first four bit positions ($b1$–$b4$) of the seventh, eightth, ninth, and tenth characters (XXX6, XXX7, XXX8, XXX9) are used to define, in BCD form, the beginning location in main memory of the B-field. (The beginning location of a B-field contains the most significant decimal digit, in BCD form, of a data word; the successively lower order decimal digits, in BCD form, will be contained in successively higher numbered locations of main memory up to the length of the B-field as defined by the instruction word, as described previously.) However, in a Read or Write instruction, except those involving a disc memory, the number defined by the $b1$–$b4$ positions of the seventh, eighth, ninth, and tenth characters of an instruction word is the number of characters to be transferred; this is called immediate addressing.

Figures 9, 10:
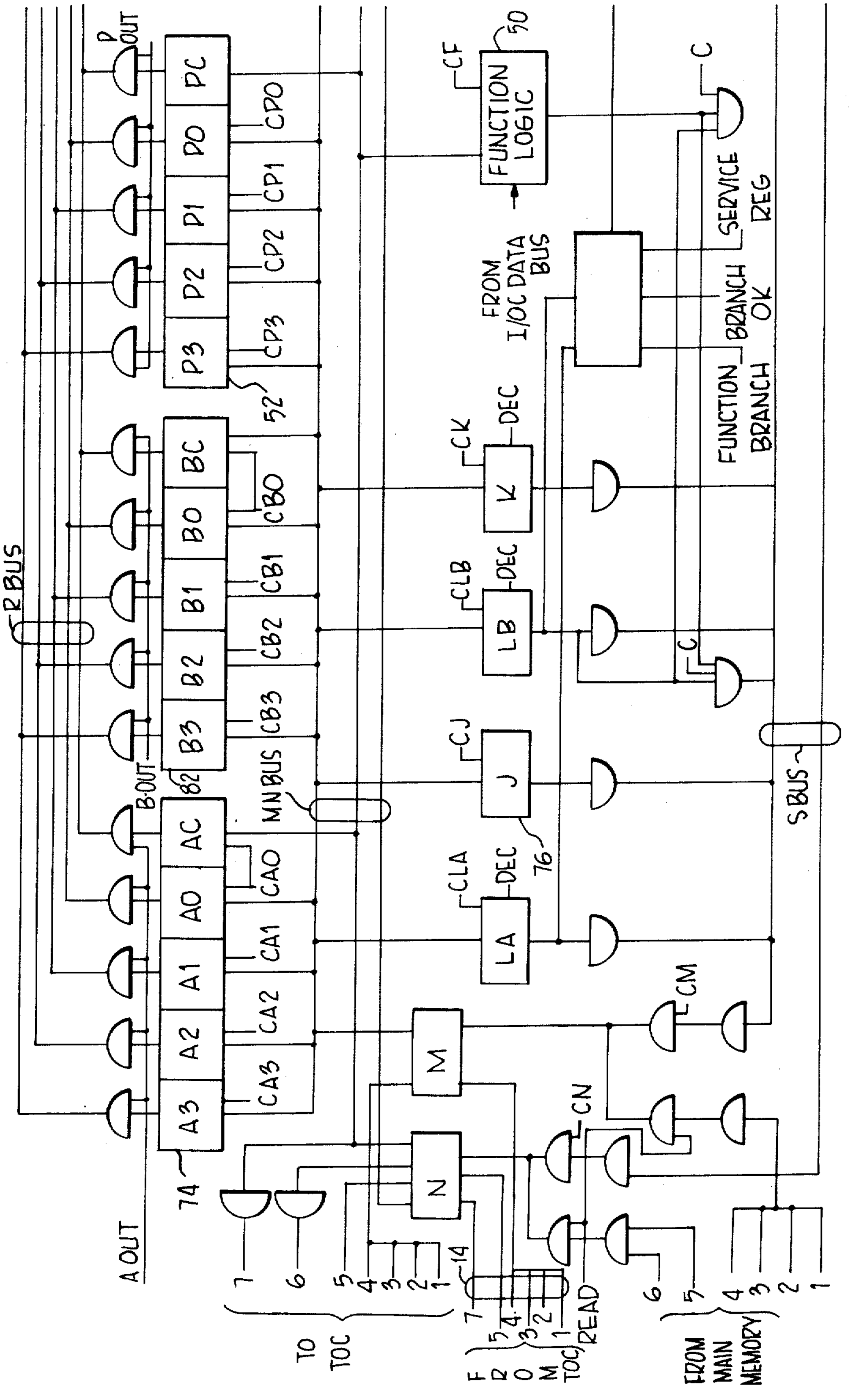
FIG. 9 is a chart showing the combined placement of FIGS. 10 and 11.
FIG. 10 is a simplified block diagram showing a portion of the supervisory control unit of the present invention.
Figure 11:
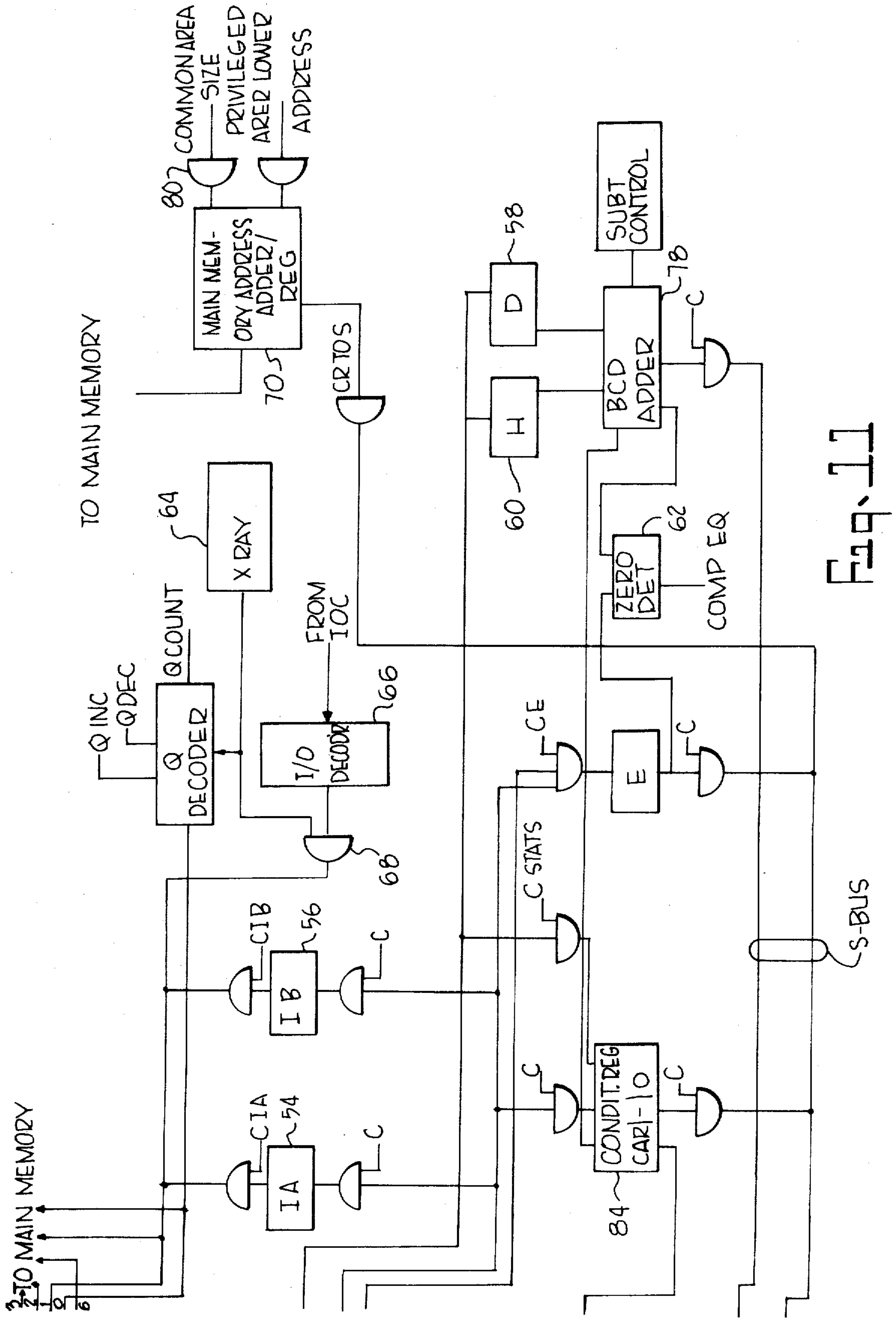
FIG. 11 is a simplified block diagram showing the remaining portion of the supervisory control unit of the present invention.
Figures 12, 13:
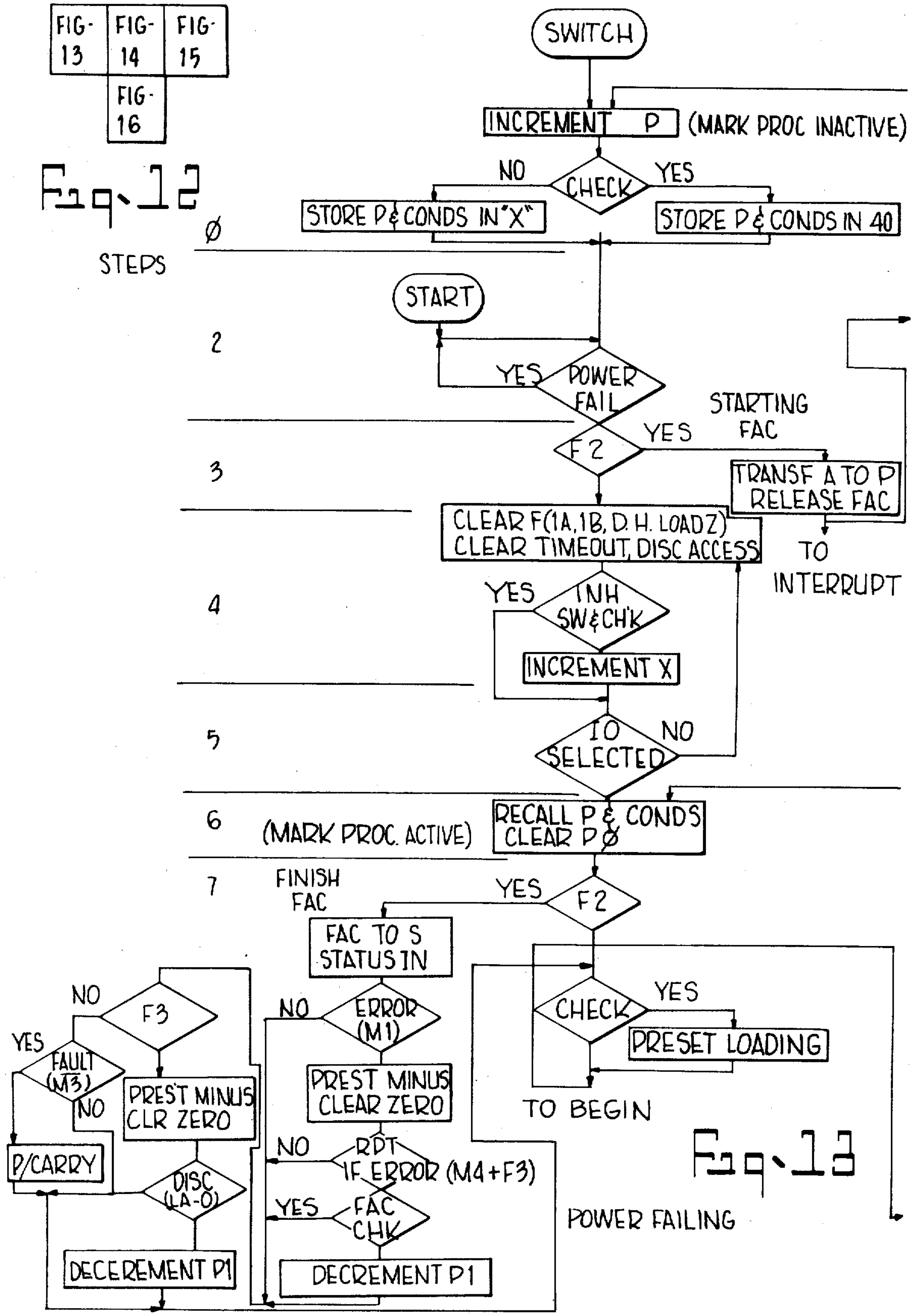
FIG. 12 is a chart showing the combined placement of FIGS. 13, 14, 15, and 16.
FIG. 13 is a flow chart showing the operation of the supervisory control unit in implementing the Switch function according to the present invention.

In FIGS. 10 and 11, there are shown in block diagram form the various data handling logic units and components comprising the supervisory control unit 10 of FIG. 1.

The various components and logic units are interconnected by various signal transmission lines, some of which are merely shown as a single line in the figures but which in reality would comprise multiwire signal lines as will be clear to a person skilled in the art to which the present invention pertains. The various logic units and components, such as for example, registers, flip-flops, counters, gates, and the like, may be any type desired as will be clear from the ensuing description.

The transfer of data between the various registers is effected at certain times as directed by signals generated within the function control unit 50 (FIG. 10) and certain other control signal sources as described herein, such as for example, a request for access to the main memory by one of the input/output controllers. Inplementation of suitable functional control logic means 50, i.e., switching circuitry is well known in the art as is shown by Chapter 3 entitled "Switching Networks", pages 51–80 of the textbook "Arithmetic Operations in Digital Computer" by R. K. Richards, copyright 1955 by D. Van Nostrand Company, Inc., Library of Congress Catalogue Card No. 55–6234. The function and general operation of the control logic will be apparent from the following description.

The operation of the supervisory control unit 10 is organized into fourteen basic functions and each of the functions is subdivided into from four to 17 "steps." The combination of a particular function and a particular step is termed a "state." For example, Read/Write is a function, while step 0 is a step, and thus the combination Read/Write-0 (RW-0) is a state.

The 13 instructions are grouped into nine basic functions as follows:

| Instruction | Function |
|---|---|
| Read | Read/Write |
| Write | |
| Add | Add/Subtract |
| Subtract | |
| Transfer | |
| Numeric Transfer | Transfer |
| Exchange | |
| Divide | Divide |
| Multiply | Multiply |
| Branch | Branch |
| Edit | Edit |
| Form Numeric Field | Form Numeric Field |
| Compare | Compare |
| Switch | (SW) Change partition being serviced |
| Begin | (BG) Fetch instruction from Main Memory |
| Index | (IX) Modify instruction addresses prior to execution |
| Interrupt | (IT) Service an in-progress I/O controller operation |
| Positioning | (PO) Increment A and B registers to address least significant digit for arithmetic operations |

The function control logic unit 50 decodes the instruction codes of an instruction retrieved from memory and recognizes service requests received from an input/output controller 18 via I/O data bus 14 (FIGS. 1 and 10).

When an input/output controller 18 requests service of the supervisory control unit, a Service Request signal is transmitted from the associated input/output controller over input/output data bus 14 into the supervisory control unit's function logic 50.

The function logic 50 responds to the Service Request signal by generating a series of control signals for accessing the main memory partition associated with the I/O controller that requested service.

The function control logic goes through a set of hardware operations best shown in the Flow CHart of FIGS. 13, 14, 15, and 16 and discussed herein with respect to the novel Switch, Begin, and Interrupt functions.

Begin Function

Figure 14:
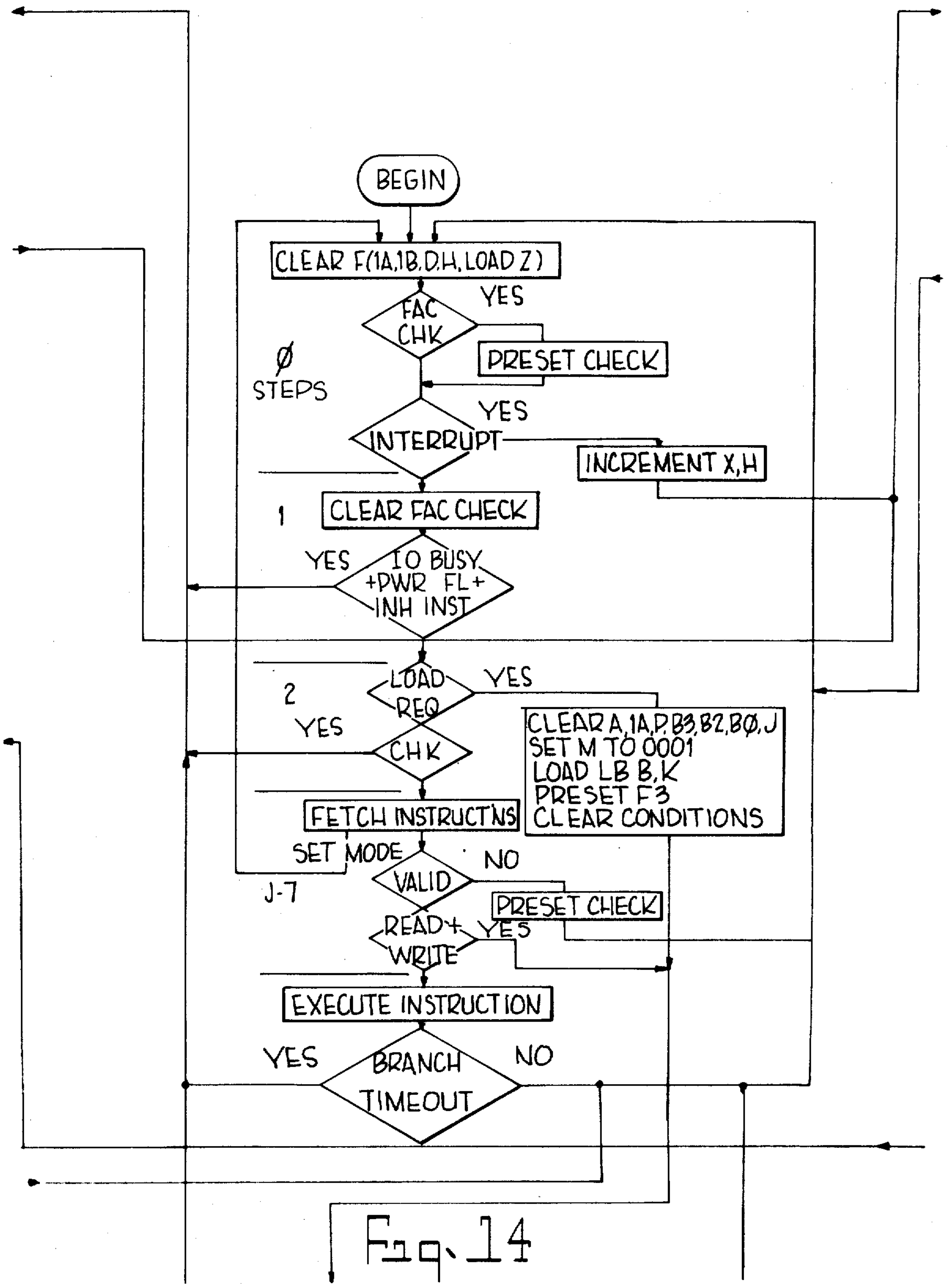
FIG. 14 is a flow chart showing the operation of the supervisory control unit in implementing the Begin function according to the present invention.
Figure 15:
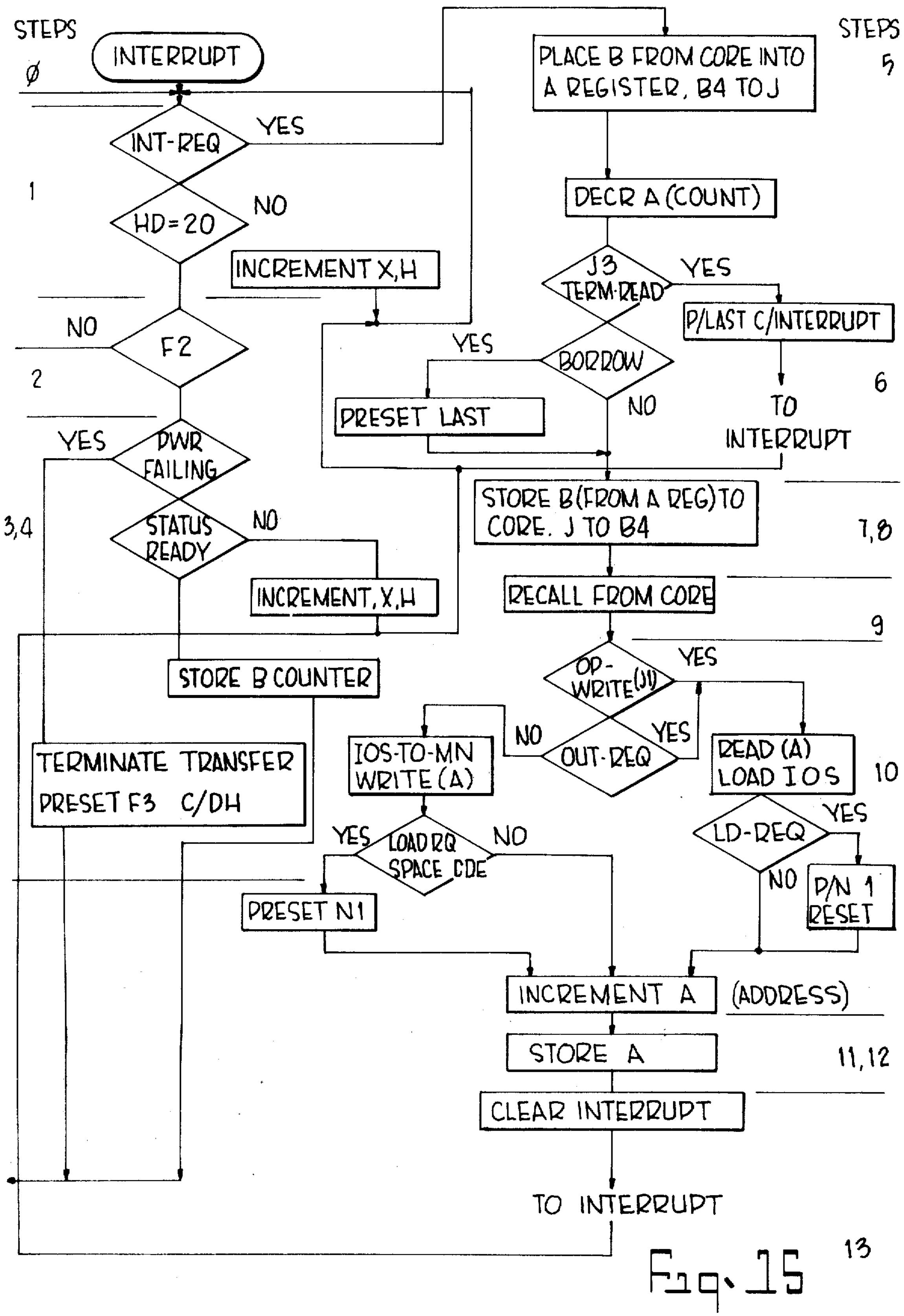
FIG. 15 is a flow chart showing the operation of the supervisory control unit in implementing the Interrupt function according to the present invention.

The function control logic 50 sequentially fetches each instruction of the program it is currently executing. Each individual instruction is executed before the next instruction is fetched. This operation of fetching a new instruction is shown in FIG. 14 as the Begin function. As a first operation in the Begin function, the function control logic clears the IA register 54 (see FIG. 11), the IB-register 56, the D-register 58, and H-register 60, and enters signals from control gate 80 into the main memory address adder/register 70 which signals define the size of the Common Area of main memory.

The function control logic then performs a test to determine if the file access error flip-flop is set. If it is, the error flip-flop (check) is set and the next operation is a test to determine if there is an input/output controller requesting service. If there is no file access data bus error, the next operation is the test to determine if there is a request for service by an input/output controller. If there is a request for service by an input/output controller, the function control logic adds a decimal count of one to the X-register 64 (FIG. 11) and the H-register 60 and then enters the Interrupt function operation which is described below.

If there is no input/output controller requesting service, the file access data bus error flip-flop (check) is reset and the function control logic then tests to determine if there is an input/output controller busy (active) signal or an inhibit instruction execution signal (from an outside source) or a "power failing" signal. If any of these signals are present, the function control logic starts the switch function of operation, described below.

If the last-mentioned tests show that no Switch function is to be performed or jumped to, the logic control unit proceeds on to the next operation of the Begin function, which operation is a test to determine if there is a request to load a new program into the currently active main memory partition.

Assuming there is no request to load a new program, a check for valid/invalid data codes is again made; then the new instruction word (next successive instruction word) as addressed by the main memory address adder/register 70 is entered into the appropriate registers where they are then checked for valid or invalid codes. If any code is invalid, an error flip-flop (check) is set and the function control logic ceases further completion of the current Begin function and causes a return or loop-back to the beginning of another Begin function operation.

Figure 16:
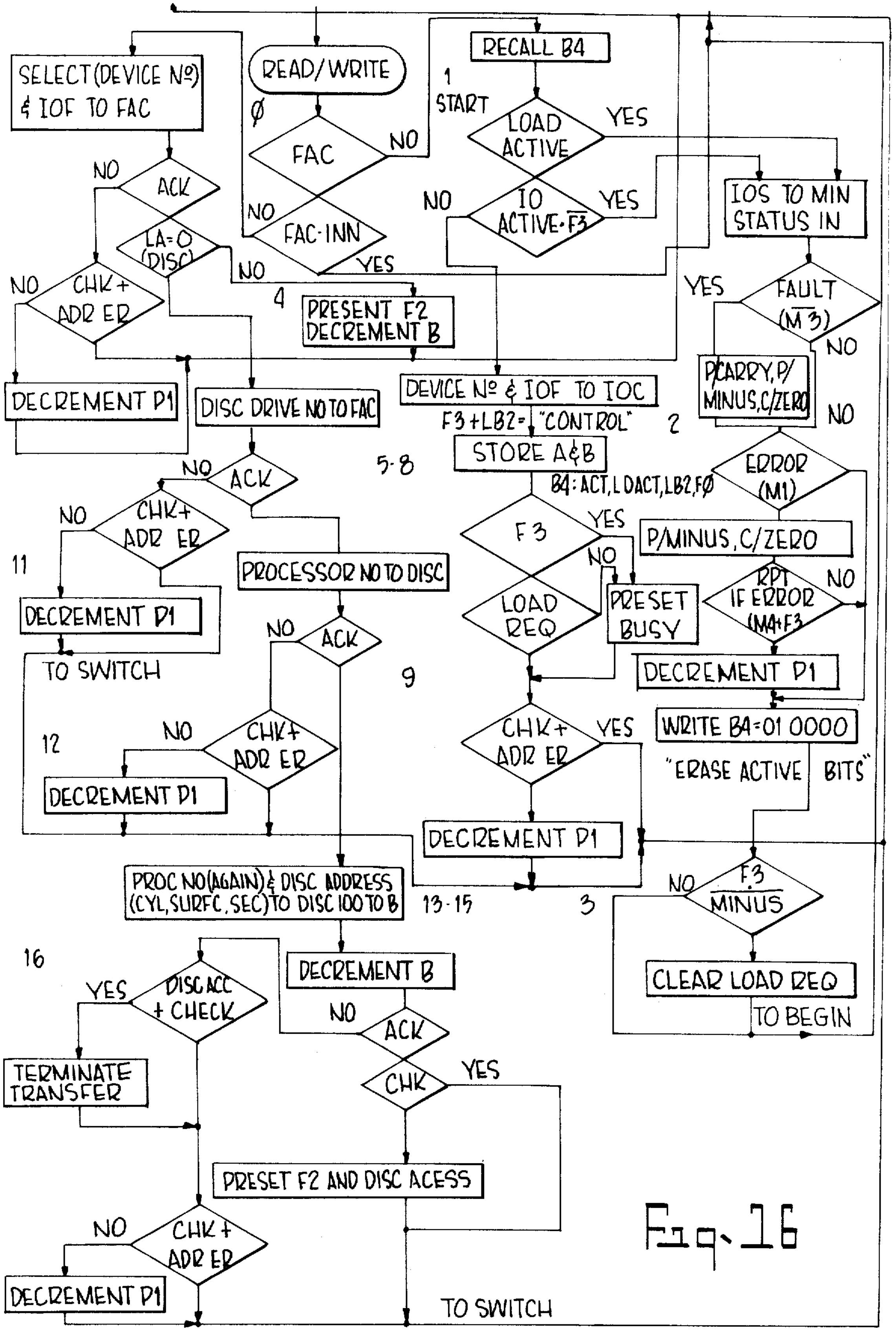
FIG. 16 is a flow chart showing the operation of the supervisory control unit in implementing the Read/Write function.

However, if codes in the instruction word are valid, the function control logic then tests the function code to determine if the instruction is a Read or Write instruction; if it is, the function control logic starts operation of the Read/Write function as shown in FIG. 16.

If the function code in the instruction word is not a REad or Write code, the function control logic executes the instruction. Execution includes indexing if called for in the instruction.

The function control logic also tests a time counter, which is started each time a new partition is entered, each time a Branch instruction is encountered in the program being executed (at least one branch instruction must be included in a partition's program).

This time elapsed test could be coupled with any other instruction in the program as desired.

The reason for this last-mentioned test is to prevent one input/output controller from completely blocking the use of the supervisory control system and main memory by other input/output controllers.

When a certain time period (time-out) has elapsed, which in the particular embodiment of the invention illustrated is 37.5 ms., and a branch instruction is encountered, the function control logic initiates the Switch function (FIG. 13) which is utilized to advance to the program of the next higher order partition of main memory; such program may have been interrupted by a request for service by an input/output controller associated with the previous or other partition.

However, if the time-out has not occurred when a branch instruction is encountered, the logic control causes repeat of the Begin function, thus fetching and execution of the next instruction as described above.

Interrupt Function

If there is an input/output controller requesting access to main memory, the function control logic causes operation or execution of the Interrupt function (FIG. 15) after first incrementing the contents of the X-Register 64 (FIG. 11) and the H-Register 60, which are used to contain an input/output controller and partition number.

The Interrupt function accomplishes data transfers between an input/output controller and main memory.

The first operation in the Interrupt function is to test if there is an input/output interrupt request by the current numbered (in X and H) output controller. If there is, the function control logic causes the B-address from the associated Protected Area in the main memory to be placed into the A-register. Then the contents of the fifth stage (*b*4) of the B-Address-Register of the Protected Area associated with the particular partitions is entered in the J-Register 76 (FIG. 10). The J-Register is an alternate storage device.

The contents of the A-Register 74 is then decreased by decimal one.

The function control logic then tests to determine if there is a Terminate Read signal. If there is not, the control logic then tests to determine if a borrow flip-flop in the BCD adder 78 (FIG. 11) is set. If it is not, the control logic then stores the contents of the A-Register 74 into the B-Address-Register of the associated section of the Protected Area of main memory. Then the contents of the J-Register 76 are entered into the B4 stage of the B-address register of the associated section of the Protected Area of main memory.

The control logic then transfers the contents of the A-address register of the Protected Area of main memory associated with the particular input/output controller into the A-Register 74 of the supervisory control unit.

The control logic then tests to determine if the required transfer of data between the supervisory control unit or main memory and the input/output controller is to be a write operation (write data from the main memory into the input/output controller).

Assuming that the required operation is not a write operation, the function control logic then tests to determine if the required operation is a request by the input/output controller for data from the main memory.

If there is a write operation requested or the input/output controller is requesting data from the main memory, the function control logic accesses the location in main memory specified by the contents of the A-Register 74 and enters or writes the data found in such location into a buffer register(s) in the particular input/output controller.

The function control logic will then add a decimal one to the contents of the A-addresses Register 74 and then store the contents in the appropriate A-addresses Register section of the Protected Area of main memory.

If, in the first operation or step of the Interrupt function the input/output controller requesting service is not the one addressed by the H and D registers, those registers are tested for a count of decimal 20. If the count is not twenty, the X and H registers are incremented by decimal one and the function control logic returns to the beginning of the Interrupt function for a repeat of the process as described above.

When the count in the H and D registers is found to be decimal twenty, the function control logic tests to determine if the file access data bus (16) is busy (being used). If it is not, the function control logic returns to the Begin function.

If the file access data bus is busy, a test is performed to determine if power is failing; if power is not failing, a test of the status of the file access data bus is made. If the data bus indicates that a file device transfer status is not complete, there is a return to the beginning of the Interrupt function after incrementing the X and H registers by decimal 1.

If the file device transfer status is complete, the contents of the B-Register 82 is stored in the appropriate B-Addresses-Register of Protected Area of main memory and the function control logic causes a jump to operations in Switch function to handle the file access data bus.

If power is failing, the function control logic causes a termination of transfer operations and goes to the point or step in Switch function to go through the file access data bus steps.

Switch Function

The purpose of the Switch function is to stop processing the program stored in one partition of main memory and proceed with processing of the programs in those partitions that may have been previously interrupted by a service request of a different input/output controller.

The first step in the Begin function is for the function control logic to place a decimal one in the PO digit of the P-addresses section of the Protected Area of main memory associated with the partition whose program is being stopped temporarily. This, of course, is to mark such associated partition as inactive.

Next, a test is made to determine if there are any errors. If there are, the contents of the P-Addressed Register and Conditions Register 84 (carry, minus, and zero) (FIG. 11) are stored in relative locations 41–44 of the associated partition.

If there are no errors, the contents of the P-Register and Conditions Register are stored in the associated P-Addresses Register of main memory Protected Area.

The function control logic then performs a test to determine if electrical power is failing; if it is, the control logic loops continuously until full power is available. When full electrical power is available (power not failing) the function control logic then tests to determine if the file access data bus is busy. If it is, the contents of the A-Register 74 are transferred to the P-Register 52 and the Interrupt function, as described above, is entered.

If the file access data bus is not busy, the function control logic effects clearing of the function codes (*f*) in the function control logic clearing of the IA-Register 54, the IB-Register 56, the D-Register 58, and the H-Register 60; and the common area size limit (Z) is loaded into the main memory address adder/register 70. In addition, the time-out counter is cleared and disc access control (a flip-flop) is cleared.

The function control logic then performs a test to determine if the error flip-flop (check) is set and there is no inhibit switch function signal. If these conditions are met, the X-Register 64 is incremented to thereby address the next successive partition.

If, however, there was an inhibit switch function signal and an error (check), the X-counter is not incremented.

The function control logic then tests to determine if there is an actual input/output controller associated with the new partition. If there is not, the function control logic causes a return to the clearing of the function decoder (*f*) IA-Register, IB-Register, etc., and performs another incrementing of the X-Register and test to determine an actual input/output controller associated with the next successive addressed main memory partition.

When there is a determination that there is an actual input/output controller associated with the addressed partition, the function control logic then transfers the contents of the associated section of the P-Addresses Register of main memory into the P-Register 52 and clears or sets a zero in the PO digit of the P-Addresses Register (this indicates that the associated input/output controller and partition are active).

The function control logic then tests to determine if the file access data bus (F2) is busy. If it is, the operations to finish servicing the file access data bus are performed, and then a test is made to determine if there are errors (check).

If the file access data bus is not busy, the function control logic proceeds directly to a test for errors (check). If there is an error, the function control logic presets a load request signal and then goes to the Begin function. If there is no error, the function control logic goes directly to Begin function.

What is claimed is:

1. In a multiprogramming data processing system wherein a plurality of addressable input/output devices originate and receive data asynchronously with respect to each other and are segregable into separate groups, the combination which comprises:

an input/ouput controlling device connected to at least one such input/output device for controlling the transmission of data to or receipt of data from such a device, said controlling device further including means to generate an interrupt signal in response to an associated input/output device desiring to transmit or to receive data;

a main memory unit coupled to each input/output controlling device and partitioned into a plurality of sequentially ordered sections which receive data and instruction words in the form of a program in each section, the number of sections being at least as great as the number of input/output controlling devices and with each section of the memory being associated with and accessible to only one particular controlling device;

control means coupled to the input/output controlling devices and to the main memory unit and responsive to the program contained in each section of the memory to execute the program instructions for a predetermined time period, said control means including means responsive to the end of said time period and to the completion of a successful branch instruction of that program to suspend execution of that program and to similarly commence execution of the program instructions contained in the next sequentially ordered section of memory with the execution of the programs in all sections of the memory continuing in a sequential round robbin manner; and means responsive to an interrupt signal received from an input/output controlling device to suspend execution of a program in a section of the main memory unit and to direct performance of the input/output command from the controlling device and any other input/output commands from any other controlling device, said means further including means responsive to the completion of performance of said input/ouput commands to direct execution of the program contained in the next sequential section of the main memory unit.

2. The system described in claim 1 wherein:

the partitioning of the main memory unit into sections is provided by adjustable connections on each input/output controlling device which determine the portion of the main memory unit that is accessible by that particular controlling device.

3. The system described in claim 2 further including:

additional memory modules which are similar to the original main memory unit, to be similarly coupled to the control means and to the input/output controlling devices, whereby the storage capacity of the original main memory is expanded.

4. The system described in claim 1 wherein:

the main memory unit contains a section in addition to those sections associated with individual controlling devices, which additional section contains a portion in which data and program instructions may be retrievably inserted from other sections and also contains a privileged section from which other sections can read data or program instructions but into which the sections cannot insert data or program instructions.

5. The system described in claim 3 wherein:

a secondary mass memory storage bank is coupled to the main memory unit and is adapted to provide additional data storage for the main memory unit and to the input-output controlling devices.

6. The system described in claim 5 wherein:

the secondary mass memory bank is coupled to the main memory unit and to the supervisory control unit by means which restrict the access to the memory bank to certain predetermined input/output controlling devices.

7. The system described in claim 1 wherein each input/output controlling device has an input/output device coupled to it by a two wire data bus over which the data transmission is bit-serial character-serial.

8. A multiprogramming data processing system which comprises:

a plurality of addressable input/output devices, each of which is utilized to originate and receive data asynchronously with respect to each other and to transmit an interrupt signal when it requests to receive data or to transmit data and program instructions, said devices to be interconnected in predetermined groups;

a plurality of controlling devices, each of which is coupled to at least one input/output device;

a main memory coupled to the controlling devices for receiving and storing data and program instructions therefrom, said memory being sectioned into individual sequential portions, the number of which is at least equal to the number of controlling devices, each individual memory portion being associated with and accessible to only one controlling device;

control means coupled to the main memory and to each controlling device, the control means executing the program instructions of a program stored in an individual portion of the main memory for a predetermined time, said control means responsive to the end of the predetermined time and to the occurrence of a successful branch instruction to suspend execution of that particular program at that point and to switch to execution of the program instructions in the next sequential portion of the main memory for a similar execution of the program contained in that portion of the memory, the sequential switching of the execution of programs in individual portions of the memory continuing on a sequential and round robbin basis for all portions of the memory; and means responsive to an interrupt signal received from an input/output device via an individual controlling device to suspend the execution of a program instruction in an individual portion of the memory and to perform an input/output command for that controlling device, said means responsive to the completion of an input/output operation for that particular controlling device to check in sequence every other controlling device and to perform an input/output operation for each succeeding controlling device which has an outstanding input/output command, said means further including means responsive to the completion of performance of all input/output operations for the controlling devices to direct said control means to commence the performance of program instructions contained in the memory portion next in sequential order to the memory portion which had had its program instructions being executed at the time of response to the interrupt signal.

9. The system described in claim 8 wherein:

the partitioning of the main memory unit into sections is provided by adjustable connections on each input/output controlling device which determine the portion of the main memory unit that is accessible by that particular device.

10. The system described in claim 9 further including:

additional memory modules which are similar to the original main memory unit, to be similarly coupled to the control means and to the input/output controlling devices, whereby the storage capacity of the original main memory is expanded.

11. The system described in claim 8 wherein:

the main memory unit contains a section in addition to those sections associated with individual controlling devices, which additional section contains a portion in which data and program instructions may be retrievably inserted from other sections and accessible thereto for reading only if so desired and also contains a privileged section from which other sections can read data or program instructions but into which the sections cannot insert data or program instructions.

12. The system described in claim 10 wherein:
a secondary mass memory storage bank is coupled to the main memory unit for providing additional data storage for the main memory unit and to the input/output controlling devices.

13. The system described in claim 12 wherein:
the secondary mass memory bank is coupled to the main memory unit and to the supervisory control unit by means which restrict the access to the memory bank to certain predetermined input/output controlling devices.

14. The system described in claim 8 wherein:
each input/output controlling unit has an input/output device coupled to it by a two wire data bus over which the data transmission is bit-serial character-serial.

* * * * *